2,711,427

PRODUCTION OF CYCLOHEXANONE OXIME

John D. Christian, Texas City, Tex., assignor to Monsanto Chemical Company, St. Louis, Mo., a corporation of Delaware No Drawing. Application September 21, 1953,
Serial No. 381,471

10 Claims. (Cl. 260—566)

The present invention relates to the production of cyclohexanone oxime and, more particularly, it pertains to the production of cyclohexanone oxime by the catalytic reduction of nitrocyclohexane.

Cyclohexanone oxime is an important chemical intermediate especially in the manufacture of the superpolyamides currently in commercial demand in the field of plastics. It has long been known that the oxime may be prepared by the partial reduction of nitrocyclohexane. Such reduction may be effected by hydrogenation in the presence of a catalyst. Grundmann (Angew. Chem., 62, 558 (1950)), in the course of a broad investigation of catalysts for the hydrogenation of nitrocyclohexane to cyclohexanone oxime, determined that a silver-containing, oxide-type catalyst was the most selective or specific and gave excellent yields. The catalysts employed may contain other oxides such as those of zinc and chromium in addition to the silver oxide.

I have now discovered that the rate of hydrogenation in the reaction in which nitrocyclohexane is converted to cyclohexanone oxime in the presence of a specific oxide-type catalyst can be significantly increased if an alkaline material is added as a promoter. The alkaline materials suitable for use as promoters are strong bases such as the alkali metal hydroxides, for example, sodium, potassium and lithium hydroxides, the quaternary ammonium bases such as tetramethyl ammonium hydroxide, trimethylbenzyl ammonium hydroxide and the like, and basic salts such as the potassium, sodium, and ammonium salts of nitrocyclohexane.

Only small amounts of the alkaline promoter are required to speed up the reaction. Quantities ranging from 0.1% to 5% by weight of the nitrocyclohexane fed are generally employed. Preferably, however, amounts representing from 0.5% to 1.0% by weight of the nitrocyclohexane charge are used.

According to the invention, nitrocyclohexane is reacted with hydrogen in a suitable reactor in the presence of an inert organic solvent and a catalyst comprising silver oxide, zinc oxide and chromium oxide and a minor amount of an alkaline material is added to the reaction mixture as a promoter.

The catalyst suitable for the hydrogenation reaction is prepared as follows:

Silver nitrate ($AgNO_3$—3.4 g), calcium nitrate $$(Ca(NO_3)_2 \cdot 4H_2O—4.7 \text{ g.})$$

and zinc nitrate ($Zn(NO_3)_2 \cdot 6H_2O$—47 g.), are dissolved in 200 ml. of hot distilled water. A second solution containing ammonium chromate (($NH_4)_2Cr_2O_7$—25.2 g.) and concentrated ammonium hydroxide (30 ml.) in 150 ml. of distilled water is prepared and poured as a fine stream into the first solution with vigorous stirring. The precipitate is immediately filtered, dried by means of suction and heated in a muffle furnace for 1.5 hr. at 350–400° C. After cooling the product is triturated in a mortar with 2N acetic acid and dried on a suction filter. This treatment is repeated and the product is finally washed with distilled water and dried at 100° C. No catalyst support is required but if desired a carrier such as pumice, clay, alumina, kieselguhr, etc., may be used.

The process is conveniently carried out in an inert, oxygen-containing organic solvent which is miscible with water. Included among such satisfactory solvents are the lower saturated aliphatic alcohols such as methanol, ethanol, and isopropanol, ether, dioxane, the monomethyl ether of ethylene glycol, the monoethyl ether of ethylene glycol, the monomethyl ether of diethylene glycol, tetrahydrofurane and the like. Methanol is by far the preferred solvent, however.

The reaction may be conducted at temperatures in the range from 90° C. to 150° C. Preferably, however, reaction temperature is maintained in the range from 115–130° C.

Pressures ranging from 500 p. s. i. to 5000 p. s. i. are suitable. Since the pressures on the high end of this range provide approximately the same results as those on the lower end of the scale, pressures from 500 p. s. i. to 750 p. s. i. are to be preferred.

The following examples will serve to illustrate the improved process of the invention but are not to be construed as limitative, in any sense, of the invention.

Example I

Approximately 50 ml. (0.411 mole) of nitrocyclohexane, 60 ml. of methanol and about 2.046 g. of a silver oxide-zinc oxide chromium oxide catalyst were charged to a hydrogenation bomb of the "rocker" type. The system was flushed with hydrogen and hydrogen was then admitted to a pressure of approximately 1600 p. s. i. After several minutes of rocking, an initial pressure reading of 1560 p. s. i. (37° C.) was recorded. The bomb was heated to 125° C. and rocked at this temperature for 11 hours. Final pressure recorded at the end of this period was 850 p. s. i. (40° C.), indicating that 92.8% of the theoretical amount of hydrogen required for the reduction had been consumed.

The liquid reaction mixture from the bomb was warmed and filtered to remove the catalyst. Warm methanol was used to dissolve any of the oxime which had crystallized from the solution and carry it along with the main body of the reaction product. The solution was stripped of methanol and cooled to give an almost solid mass of crystalline cyclohexanone oxime. This mass was broken up and filtered to give a solid mass of oxime crystals. The filtrate was cooled and filtered again to give an added amount of crystalline material. The recovered oxime was washed with very cold petroleum ether (15 cc. chilled to —78° C.) and dried. This material had a melting point of 86–90° C. (Literature value for cyclohexanone oxime 89–90° C). The total cyclohexanone oxime produced was 30.8 g. (0.272 mole) which represents a conversion of 67% of the nitrocyclohexane.

Example II

The experiment described in Example I was repeated except that a small amount (0.465 g. equivalent to 1% of the nitrocyclohexane fed) of the sodium salt of nitrocyclohexane was added to the starting materials in the bomb. The pressure drop was followed after the bomb had reached reaction temperature, by recording pressure measurements at intervals during the hydrogenation. In this case, the reaction was complete in about 4.5 hr., 112% of the thoretical amount of hydrogen required having been consumed in that period of time. The total amount of cyclohexanone oxime produced was 31.9 g. (0.282 mole) which represents a conversion of 68% of the nitrocyclohexane,

Example III

The experiment of Example II is repeated except that approximately 0.55 g. of sodium hydroxide is substituted for the sodium salt of nitrocyclohexane in the reaction mixture charged to the hydrogenation bomb to "promote" the reaction. A comparable yield of cyclohexanone oxime is obtained and a comparable accelerating effect on reaction rate is observed.

Example IV

Approximately 50 ml. (0.411 mole) of nitrocyclohexane, 60 ml. of methanol, about 2.05 g. of a silver oxide-zinc oxide-chromium oxide catalyst, and about 0.5 g. of trimethylbenzyl ammonium hydroxide are charged to a hydrogenation bomb of the "rocker" type and reacted according to the procedure described in Example I. An excellent conversion of nitrocyclohexane to cyclohexanone oxime is obtained and the reaction rate observed is much accelerated over that of Example I and comparable to the rates obtained in Examples II and III.

What is claimed is:

1. In a process for the production of cyclohexanone oxime by the hydrogenation of nitrocyclohexane in the presence of a silver oxide catalyst and in an inert organic solvent medium, the improvement which comprises adding an alkaline promoter chosen from the group consisting of the alkali metal hydroxides, the quaternary ammonium hydroxides, and alkaline metal salts in an amount in the range of from about 0.1% to about 5% by weight of the nitrocyclohexane fed.

2. In a process for the production of cyclohexanone oxime by the hydrogenation of nitrocyclohexane in the presence of a silver oxide catalyst and in an inert organic solvent medium, the improvement which comprises adding an alkaline promoter chosen from the group consisting of the alkali metal hydroxides, the quaternary ammonium hydroxides, and alkaline metal salts in an amount in the range of from about 0.5% to about 1.0% by weight of the nitrocyclohexane fed.

3. The process of claim 1 wherein the alkaline promoter is sodium hydroxide.

4. The process of claim 1 wherein the alkaline promoter is trimethylbenzyl ammonium hydroxide.

5. The process of claim 1 wherein the alkaline promoter is the sodium salt of nitrocyclohexane.

6. A process for the production of cyclohexanone oxime which comprises reacting nitrocyclohexane with hydrogen in an inert organic solvent medium at a temperature from about 90° C. to about 150° C. and a pressure from about 500 p. s. i. to 5000 p. s. i., in the presence of a silver oxide catalyst and from about 0.1% to about 1% by weight of the nitrocyclohexane fed of an alkaline promoter chosen from the group consisting of the alkali metal hydroxides, the quaternary ammonium hydroxides, and alkaline alkali metal salts.

7. The process of claim 6 wherein said alkaline promoter is sodium hydroxide.

8. The process of claim 6 wherein said alkaline promoter is trimethylbenzyl ammonium hydroxide.

9. The process of claim 6 wherein said alkaline promoter is the sodium salt of nitrocyclohexane.

10. A process for the production of cyclohexanone oxime which comprises reacting nitrocyclohexane with hydrogen in methanol at a temperature of about 125° C. and a pressure of about 750 p. s. i. in the presence of a silver-oxide-zinc oxide-chromium oxide catalyst and about 1% by weight of the nitrocyclohexane fed of the sodium salt of nitrocyclohexane as a promoter with said catalyst.

No references cited.